Aug. 3, 1948.  R. E. WOOLLEY  2,446,400
CHART SUPPORTING AND FEEDING MEANS
FOR RECORDING INSTRUMENTS
Filed Nov. 10, 1944  2 Sheets-Sheet 1
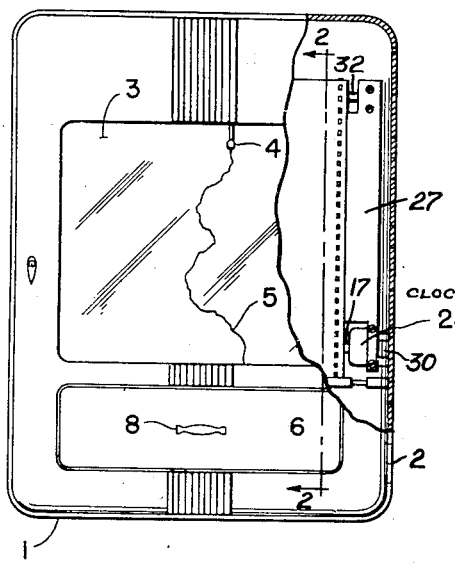
FIG. 1
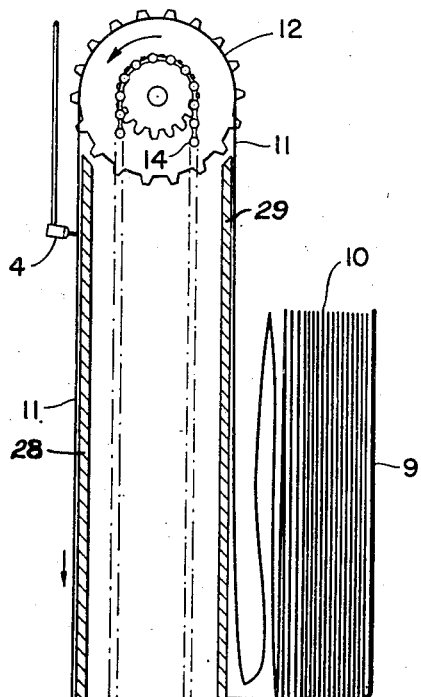
FIG. 2
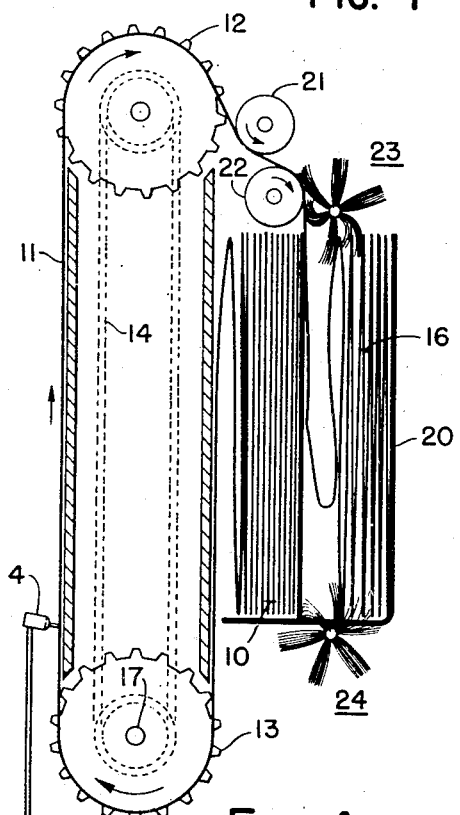
FIG. 4
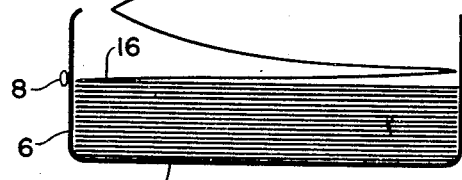
INVENTOR.
REW E. WOOLLEY
BY
*Raymond W. Junkins*
ATTORNEY

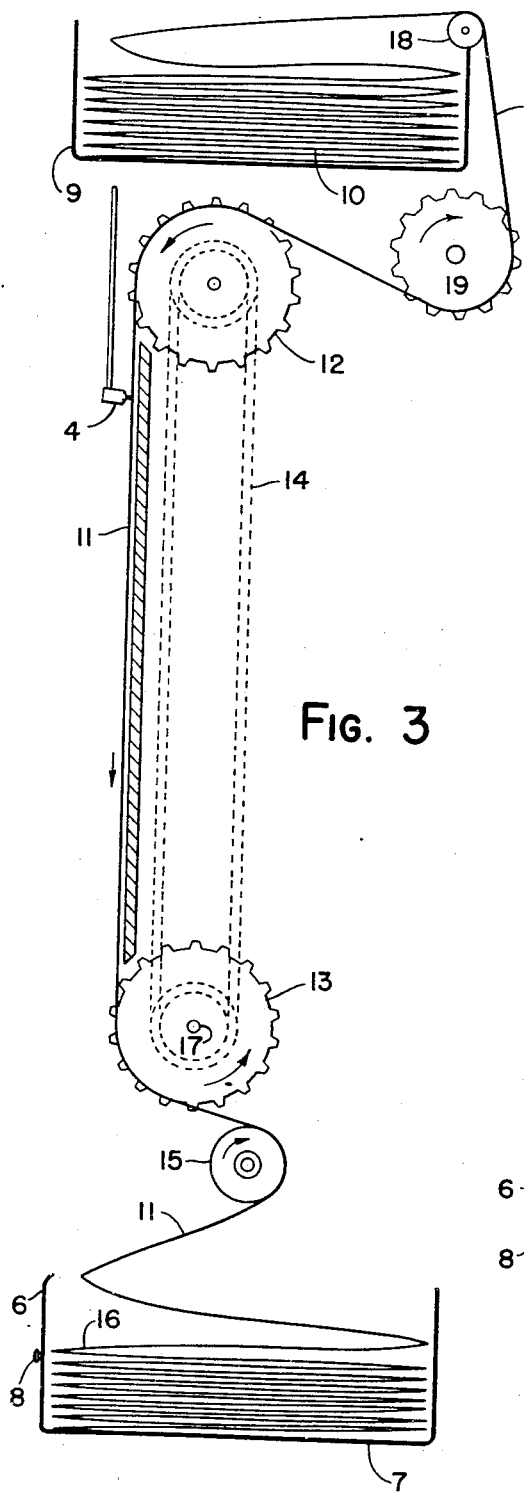
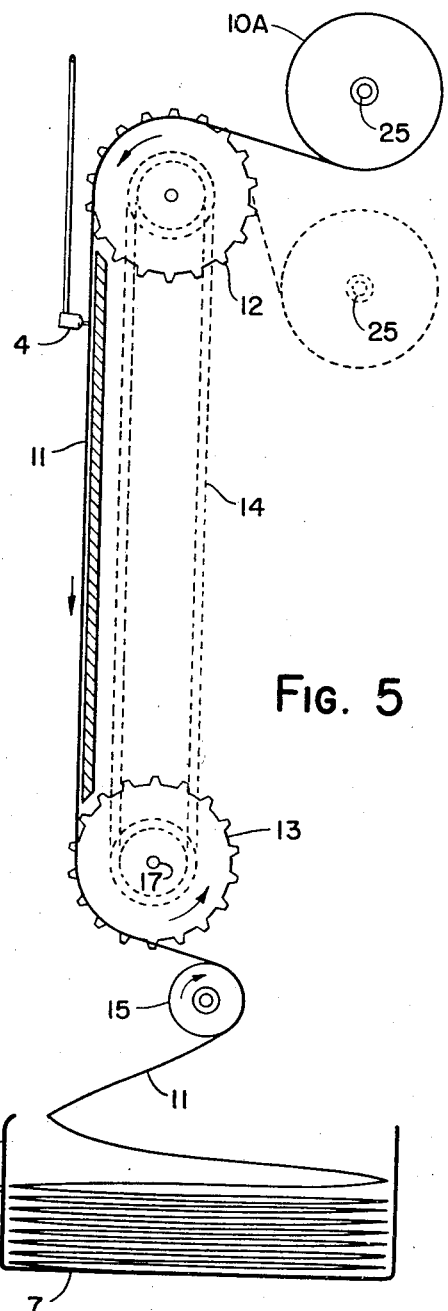

Patented Aug. 3, 1948

2,446,400

UNITED STATES PATENT OFFICE 2,446,400

CHART SUPPORTING AND FEEDING MEANS FOR RECORDING INSTRUMENTS

Rew E. Woolley, Cleveland Heights, Ohio, assignor to Bailey Meter Company, a corporation of Delaware Application November 10, 1944, Serial No. 562,868

2 Claims. (Cl. 346—22)

This invention pertains to measuring and recording instruments, and particularly to improvements in strip chart recorders.

Strip chart recorders are well known and include an elongated or strip chart continuously moved at a uniform rate past the recording pen or pens through the agency of a mechanical or electrical clockwork or other time representative means. Usually a time portion of the full width of the traveling strip is visible through a glass window of a door in the instrument case, whereby the relative position of the recording means, as well as a time portion of the chart record, are observable by an operator.

In comparison with the known circular chart which is usually rotated in twenty-four hours the strip chart provides enough record blank for twenty days or more. A few hours of the record, however, are all that is continuously observable. It has been necessary either to wait until an entire strip chart has been moved past the recording mechanism before removal from the casing, or to tear off sections at intervals, such as day by day. A problem then presents itself in the filing of and future reference to the torn off portions or the rerolled complete chart.

The usual rate of speed of the strip chart past the recorder mechanism is three inches per hour, or six feet in twenty-four hours. If each day's record is torn off, then a considerable amount of paper is wasted in feeding the torn end of the remaining strip through the winding mechanism and properly aligning the recorder mechanism on a time basis. Furthermore, the six foot long daily records are inconvenient to file flat and must be folded into some sort of book shape.

Strip charts are usually supplied in thirty to forty yard lengths, which means that one or two rolls must be used per month. If a forty yard roll is rewound continuously in the recorder and removed only upon completion of its entire record length, then the search through numerous record rolls for any particular day's operation is a tedious unrolling and rerolling proposition.

A particular feature of the present invention is directed to improvements in recording mechanisms of the strip chart type providing more ready reference to the completed record chart while in the instrument and more ready filing and reference conditions after the chart has been removed from the recorder mechanism.

In the drawings:

Fig. 1 is a front elevation of a recording instrument embodying my invention.

Fig. 2 is an enlarged sectional view of the chart supporting and feeding means, taken on the plane of the line 2—2 of Fig. 1.

Figs. 3, 4 and 5 are similar to Fig. 2 but show different types and arrangements of supporting means for the blank and inked portions of the chart.

Referring now in particular to Fig. 1, the recording instrument case has a front door or access panel 1, hinged to the case as at 2, and provided with a window 3 which may be glass. Through the window is visible the recording pen 4 and a portion 5 of the record which may, for example, cover the preceding four hours. The door 1 is further provided with an opening which (in Fig. 1) is filled by the front panel 6 of a drawer 7 having a handle 8. The drawer 7 is preferably so mounted within the recorder casing as to be self-supporting and allow the front door 1 to be opened or closed relative to the drawer panel 6 without disturbing the latter or interrupting the recording operation or chart supply. At the same time with the door 1 in closed position (as in Fig. 1) the drawer 7 may be pulled forward through the agency of the handle 8.

Referring now in particular to Fig. 2, I illustrate in diagrammatic fashion a portion of a sectional elevation through the instrument of Fig. 1. The portion which I have shown comprises the strip chart and a part of its driving mechanism. I have not felt it necessary to illustrate or describe in detail the clockwork for driving the same. In the usual strip chart instrument the strip chart is received in a roll of about thirty to forty yards in length. As it is drawn beneath or past the recording pen it may be rerolled upon a spool or spindle. In my present invention I employ a strip chart which has been folded in opposite direction about every twelve inches of its length, and thus comprises a sort of pad approximately twelve inches in its lengthwise direction by the width of the strip chart. Such pad feeds continuously through the recording mechanism and is reassembled into pad form after the record thereon has been completed. A container 9 is provided for receiving the pad 10 of strip chart 11 in its uninked or blank state. The chart 11 is provided along its edges with a series of perforations adapted to register with the teeth of a pair of pull wheels 12 at an uppermost point of the assembly and to register with the teeth of a pair of pull wheels 13 at a lower portion of the assembly. The wheels 12, 13 are kept in synchronism by a drive chain 14 so that either the upper wheels 12 or the lower wheels 13 are driven by the clockwork, and the other pair of wheels is driven through the chain 14.

As illustrated in Fig. 2, it is immaterial what driving means are provided for the strip chart 11 so long as the same is moved downwardly past the recording pen at a uniform speed. In Fig. 1 I have shown a clockwork mechanism 26 supported by a framework 27 including chart guide plates 28, 29, (Fig 2), and the mechanism is operatively connected to a shaft 17 on which the pull wheels 13 are fixed. Plates 28 and 29 define front and rear faces of the recording device. As the chart 11 leaves the pull wheels 13, it is passed over an idle roll 15 to maintain arcuate contact with the teeth of wheels 13. Thereafter the strip chart 11, still bearing evidence of its initial folding creases, drops in pad form to pile up in the drawer 7 forming a pad 16 similar in nature to the blank pad 10.

It is, of course, understood that the pad 10 of blank strip chart is folded by rather accurately spaced creases of not too tight compression. Thus as the strip chart 11 passes under the recording pen 4 the folding creases are not sharp enough to catch the pen 4 or cause it to jump on the chart. The creases, however, persist to an extent that as the strip chart falls by gravity from the idle roll 15 to the drawer 7 they promote the padding or falling of the chart into layers, as clearly illustrated.

As previously mentioned, the drawer 7 may be pulled forward toward the operator without opening the door 1, and the necessary stop is provided on the casing so that the drawer will not fall out. With the drawer in its extended position the pad 16 may be lifted out and examined in book form without the necessity of unrolling a considerable length of rolled chart and without disturbing the continued passage of the chart 11 under the pen 4 to form the record 5. Thus either leaving the pad 16 within the drawer 7 or lifting it therefrom the day by day or hour by hour record may be examined as one would leaf through a book and then replaced at will within the drawer 7, which is then pushed back into its original position within the casing. At any time any desired portion of the pad 16 may be cut off and removed without the necessity of rethreading a chart over drive wheels 12 or 13, or wasting paper. Upon the pad 10 being completely transferred to comprise the pad 16 the latter may be removed and filed as in book form for convenience and ready reference, occupying relatively small space, or may be punched for ring binder filing. The great ease of later reference, as by leafing through the pages of a book, is apparent as compared to unrolling the thirty or forty yard roll, or the handling of six foot lengths of relatively flimsy paper.

I contemplate that a standard 12-inch wide strip chart forty yards in length will be folded at approximately 12-inch lengths, making 120 leaves in a pad 12 x 12 x approximately 1¼ inches thick. Such a pad could be readily filed or bound in book form for future reference.

In order to replenish the supply of strip chart paper, as for example inserting a new pad 10 in a container 9, I provide means at 30 in axial alignment with the shaft 17 for pivotally supporting the framework 27 at the sides of the casing 1. The upper end of the framework is free of the casing and provides a rotatable support for a shaft 32 carrying the wheels 12. The complete assembly, including the framework 27, the drive wheels 12, the drive chain 14, the container 9 (supported by plate 29) and the usual clock drive mechanism may all be rotated (counter-clockwise in Fig. 2) after moving pen 4 out of the way. The necessary stop and latches are provided so that this assembly is normally held in operating position as shown in Fig. 2. When it is necessary to replenish the pad 10 the front door 1 is opened, the pen 4 is moved out of the way, the latches are loosened, and the assembly comprising the chart drive mechanism in toto is angularly moved around the pivot 30 toward the door 1 and operator, this providing easy access to the chart supporting means or container 9 for inserting a new pad 10 and threading the paper over the drive wheels 12 and 13. It is further possible that the end of the strip 11 last to emerge from the container 9, will have a gummed band to which the beginning of the new pad 10 may readily be fastened. In this manner, a new pad 10 may be fed into service without interrupting the record and without any waste of paper.

I would provide the necessary stops against which to lay the assembly at some convenient angle when tilted forwardly around the horizontal axis of pivot 17. Another possibility is that the drawer 7 may be pulled forward and the chart drive assembly angularly moved until it rests on the drawer 7, while a new pad 10 is put in place.

It will be appreciated that the various figures of the drawing are quite diagrammatic and are not to scale. For example, in Fig. 2 the dimensions are distorted and the width of fold of the pads 10 and 16 would probably be of greater extent than are actually here shown, although this is by no means a limitation. The width of fold or number of folds in a pad comprising a total length of say thirty or forty yards is entirely a matter of dimensional convenience, depending upon the available space within the casing.

In Fig. 3 I illustrate that the container 9, including the supply pad 10, may be mounted above the chart drive assembly, which allows servicing as by replenishing with a new pad 10 without the necessity of rotating or angularly moving the drive assembly forwardly around the pivot 17 unless accidentally the supply of pad 10 is allowed to run out and then it becomes necessary to thread a new strip over the idle roll 18 and idle toothed supporting roll 19.

In Fig. 4 I show the possibility of having a container 20 at the rear of and carried by the chart drive mechanism to contain both the blank pad 10 and the pad 16 of record chart. In this arrangement provision is made for urging the strip 11 into pad formation as it is carried between the idle rolls 21, 22 into a compartment of the container 20. Such provision comprises elongated brushes 23, 24 which may be of stiff bristles, rotated slowly in proper direction by the chart driving mechanism and arranged to continually urge the finished chart strip into folded pad position.

In Fig. 5 I illustrate an embodiment of my invention wherein the blank strip chart is supplied in the form of a roll 10A suitably mounted on supporting centers 25 in most convenient location and feeding over the toothed rolls 12 and 13 in a manner similar to that shown in Fig. 2. The centers 25 need not be power rotated, but may be merely rotative holders for the roll of paper 10A with necessary friction means so that the pull wheels 12 may readily unwind the roll 10A. Preferably the roll 10A will be mounted along with the chart drive mechanism so that the entire assembly may be angularly moved about the pivot 17 as explained in connection with Fig. 2. With this arrangement I would provide that the strip of chart paper comprising the roll 10A be prepared when printed to fall into the container 7 in folds and reverse fold pad form as clearly illustrated. Such preparation may comprise a slight creasing at predetermined intervals or an imprinting of a heavy row of dashes or partial perforations. There are many ways in which the strip may be prepared at predetermined intervals, so that it will readily fall into a fold and refold pad. It is only necessary that any one of numerous well known fold accelerators be incorporated in the paper comprising the roll 10A.

In general, it will be observed that I have provided through my invention an improved recording instrument of the strip chart type wherein the record strip may be inserted, operated and removed with a greater ease and efficiency than previously.

What I claim as new, and desire to secure by Letters Patent of the United States, is:

1. In a recording instrument having a casing with a removable access panel, a device enclosed within the casing behind said panel for continuously feeding a strip chart past a recording pen, said device being mounted in said casing for forward tilting of its upper end about a horizontal axis and including a front face defining portion adjacent said panel, and a strip chart supporting means within said casing rearwardly of said device, the combination of a drawer with an outer end panel separate from and positioned below said device and constructed and arranged to receive the chart as it is fed from said device, the access panel having an opening shaped and arranged to be filled by the outer end panel of said drawer when said drawer is in closed position and through which said drawer may be removed outwardly of the casing and relative to the feeding device without interrupting the recording operation, and means for slidably supporting said drawer within said casing in a position for receiving said chart and for movement through said opening.

2. In a recording instrument having a casing with a removable access panel, a device enclosed within the casing behind said panel for continuously feeding a strip chart past a recording pen, said device being mounted in said casing for forward tilting of its upper end about a horizontal axis and including a front face defining portion adjacent said panel and a spaced rear face defining portion, and a strip chart supporting means on the rear face defining portion, the combination of a drawer with an outer end panel separate from and positioned below said device and constructed and arranged to receive the chart as it is fed from said device, the access panel having an opening shaped and arranged to be filled by the outer end panel of said drawer when said drawer is in closed position and through which said drawer may be removed outwardly of the casing and relative to the feeding device without interrupting the recording operation, and means for slidably supporting said drawer within said casing in a position for receiving said chart and for movement through said opening.

REW E. WOOLLEY.

REFERENCES CITED

The following references are of record in the file of this patent:

UNITED STATES PATENTS

| Number | Name | Date |
| --- | --- | --- |
| 558,080 | Kinnard | Apr. 14, 1896 |
| 932,283 | Johnson | Aug. 24, 1909 |
| 1,015,580 | Nichols | Jan. 23, 1912 |
| 1,525,329 | Singer | Feb. 3, 1925 |
| 1,611,585 | Forman | Dec. 21, 1926 |
| 1,753,923 | Felty | Apr. 8, 1930 |
| 1,841,932 | Bourjuin | Jan. 19, 1932 |
| 1,847,918 | Blanchard | Mar. 1, 1932 |
| 1,927,899 | Mylius et al. | Sept. 20, 1933 |
| 1,979,985 | Moone | Nov. 6, 1934 |
| 2,020,805 | Sherman et al. | Nov. 12, 1935 |
| 2,040,634 | Sekyra | May 12, 1936 |
| 2,119,339 | Mayo | May 31, 1938 |
| 2,135,364 | Templeton | Nov. 1, 1938 |
| 2,273,162 | Willard | Feb. 17, 1942 |
| 2,275,475 | Sherman | Mar. 10, 1942 |
| 2,319,273 | Sterling | May 18, 1943 |
| 2,341,118 | Rodanet | Feb. 8, 1944 |
| 2,360,965 | Mosher | Oct. 24, 1944 |